United States Patent
Lang et al.

(10) Patent No.: US 10,014,530 B2
(45) Date of Patent: Jul. 3, 2018

(54) ELECTRODE ASSEMBLY AND METHOD FOR ITS PREPARATION

(71) Applicant: OXYNERGY LTD., Lod (IL)

(72) Inventors: Joel Lang, Givataim (IL); Irina Kobrin, Kiryat Ekron (IL); Omri Feingold, Gedera (IL); Ori Tzidon, Tel Aviv (IL)

(73) Assignee: OXYNERGY LTD., Lod (IL)

(*) Notice: Subject to any disclaimer, the term of this patent is extended or adjusted under 35 U.S.C. 154(b) by 104 days.

(21) Appl. No.: 14/429,069

(22) PCT Filed: Oct. 9, 2013

(86) PCT No.: PCT/IL2013/000076
§ 371 (c)(1),
(2) Date: Mar. 18, 2015

(87) PCT Pub. No.: WO2014/057483
PCT Pub. Date: Apr. 17, 2014

(65) Prior Publication Data
US 2015/0207150 A1    Jul. 23, 2015

Related U.S. Application Data

(60) Provisional application No. 61/711,234, filed on Oct. 9, 2012.

(51) Int. Cl.
*H01M 4/86* (2006.01)
*H01M 4/88* (2006.01)
(Continued)

(52) U.S. Cl.
CPC ....... *H01M 4/8626* (2013.01); *H01M 4/8652* (2013.01); *H01M 4/8668* (2013.01);
(Continued)

(58) Field of Classification Search
None
See application file for complete search history.

(56) References Cited

U.S. PATENT DOCUMENTS 3,553,024 A    1/1971    Fishman
4,756,980 A    7/1988    Niksa et al.
(Continued)

FOREIGN PATENT DOCUMENTS

CN    1853301    10/2006
CN    1910783    2/2007
(Continued)

OTHER PUBLICATIONS

Chinese Office Action issued in App. No. 201380052870.7 dated Sep. 26, 2016 (w/ translation).
(Continued)

*Primary Examiner* — Barbara L Gilliam
*Assistant Examiner* — Wyatt P McConnell
(74) *Attorney, Agent, or Firm* — Nixon & Vanderhye P.C.

(57) ABSTRACT

The invention provides electrodes suitable for use as air electrodes, processes for their preparation and metal/air cells utilizing such electrodes as air cathodes. The invention relates to an electrode comprising a catalytically active layer applied on one face of a hydrophobic porous film and a conductive current collector pressed onto said catalytically active face, wherein at least a portion of the marginal area of said face is free from catalyst, and wherein a sealant is provided around at least part of the perimeter of said catalytically active layer, said sealant forming a coating onto the catalyst-free marginal area of said hydrophobic film.

13 Claims, 7 Drawing Sheets

(51) Int. Cl.
  *H01M 4/90* (2006.01)
  *H01M 4/92* (2006.01)
  *H01M 8/0273* (2016.01)
  *H01M 8/0284* (2016.01)
  *H01M 12/06* (2006.01)
  *H01M 12/08* (2006.01)

(52) U.S. Cl.
  CPC ....... *H01M 4/8803* (2013.01); *H01M 4/8817* (2013.01); *H01M 4/8828* (2013.01); *H01M 4/8878* (2013.01); *H01M 4/8885* (2013.01); *H01M 4/9016* (2013.01); *H01M 4/923* (2013.01); *H01M 8/0273* (2013.01); *H01M 8/0284* (2013.01); *H01M 12/06* (2013.01); *H01M 12/08* (2013.01); *H01M 2220/20* (2013.01); *Y02E 60/128* (2013.01)

(56) References Cited

U.S. PATENT DOCUMENTS

| | | | |
|---|---|---|---|
| 5,107,327 | A | 4/1992 | Nishimori et al. |
| 6,368,738 | B1 | 4/2002 | Passaniti et al. |
| 7,226,885 | B2 | 6/2007 | Janowitz et al. |
| 8,142,938 | B2 | 3/2012 | Khasin et al. |
| 2004/0031143 | A1 | 2/2004 | Morris et al. |
| 2005/0014056 | A1 | 1/2005 | Zuber et al. |
| 2007/0077485 | A1 | 4/2007 | Takamura et al. |
| 2007/0212583 | A1 | 9/2007 | Johnson |
| 2007/0215461 | A1 | 9/2007 | Zuber et al. |
| 2011/0318482 | A1 | 12/2011 | Morioka et al. |
| 2012/0208094 | A1 | 8/2012 | Khasin et al. |

FOREIGN PATENT DOCUMENTS

| | | |
|---|---|---|
| CN | 101583420 | 11/2009 |
| JP | 48-516 U | 1/1973 |
| JP | 7-114927 | 5/1995 |
| JP | 2002-289266 | 10/2002 |
| WO | WO 2003/71563 | 8/2003 |
| WO | WO 2007/13077 | 2/2007 |

OTHER PUBLICATIONS

Extended European Search Report issued in App. No. 13844613.3 dated Apr. 21, 2016.
European Office Action issued in App. No. 13844613.3 dated Dec. 21, 2016.
International Search Report for PCT/IL2013/000076, dated Mar. 25, 2014, 3 pages.
Written Opinion of the ISA for PCT/IL2013/000076, dated Mar. 25, 2014, 7 pages.
Search Report issued in CN App. No. 201380052870.7 dated Jul. 26, 2017 (with partial translation).
Translation of Notice of Rejection issued in JP App. No. 2015-536282 dated Jun. 27, 2017.

ELECTRODE ASSEMBLY AND METHOD FOR ITS PREPARATION

This application is the U.S. national phase of International Application No. PCT/IL2013/000076, filed 9 Oct. 2013, which designated the U.S. and claims the benefit from U.S. Provisional Application No. 61/711,234, filed 9 Oct. 2012, the entire contents of each of which are hereby incorporated by reference.

The invention relates to an electrode assembly which is suitable for use, inter alia, as an air cathode in metal/air batteries and in fuel cells containing an alkaline electrolyte.

Figure 1:
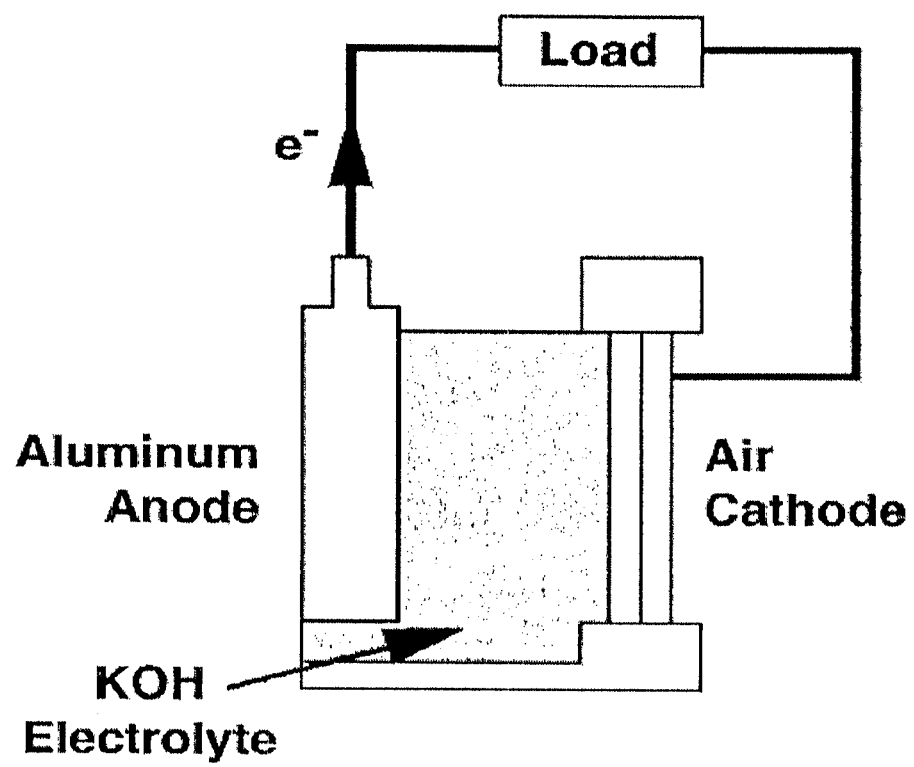

In its most general form, the operation of a metal/air electrochemical cell is based on the reduction of atmospheric oxygen, which takes place at the cathode, and the oxidation of metallic anode. The aqueous electrolyte present in the cell is a highly alkaline solution, e.g., highly concentrated potassium hydroxide solution. A typical structure of a metal/air battery is schematically shown in FIG. 1, in which the air cathode, the consumable metallic anode and the electrolyte are shown.

A commonly used air cathode consists of (i) an electronically conductive screen, an expanded foil or a metallic foam which serves as a current collector, (ii) active electrode particles provided within the current collector (including a catalyst for promoting the reduction of oxygen) and (iii) hydrophobic porous film (PTFE, Teflon®) supported on one face of said screen or foil. The two opposing faces of the air cathode are exposed to the atmosphere and the alkaline electrolyte, respectively. The air cathode is permeable to air, while its external face is hydrophobic and impermeable to the aqueous electrolyte.

The anode immersed in the electrolyte is made of metals such as aluminum, zinc, magnesium, iron and alloys thereof. When aluminum anode is used, then the cell is a primary cell. In the case of zinc anode, both primary and secondary cells are known.

The discharge reaction for air/aluminum cell is as follows:

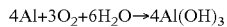

$$4Al+3O_2+6H_2O \rightarrow 4Al(OH)_3$$

Recharging of the cell is effected by replacing the spent aluminum anode after it has been substantially consumed in the cell reaction with a fresh anode.

The production of air cathodes is usually based on processing a suitable electrode material (e.g., platinum or silver, supported on carbon, cobalt porphyrin, manganese dioxide mixed with a carbon support) in a powder roller to produce a thin foil which is then packed onto a metallic support (e.g., in the form of a screen or a woven net), using another pair of rollers, for increasing the mechanical strength and the current collection, as described in U.S. Pat. No. 7,226,885. A rectangular or square electrode that will be shaped following this method of production is characterized in that the electrode material inevitably reaches the edges of the metallic support on two parallel sides. Thus, such an electrode can be electronically welded to another conductive metal, for the purpose of enhanced current collection, on two sides only, those which are devoid of the active electrode material.

U.S. Pat. No. 4,756,980 describes the production of a carbon black electrode through the following sequence of steps. First a carbon layer which contains a binder and cobalt catalyst is prepared. Silver plated nickel meshes are then placed on both faces of said layer. The double-gridded layer is pressed flat and subsequently sintered at 300° C. A silver plated copper frame having horizontal and vertical edges is provided on the periphery of the carbon electrode.

U.S. Pat. No. 8,142,938 describes the preparation of an air electrode. The active material, consisting of a mixture of silver/zirconium oxide particles and a binder, was loaded onto a woven stainless steel grid which was used as a current collector and supporting member of the electrode. A PTFE gas diffusion membrane was then attached to one face of the electrode. Following compaction in the dye of a press-mold, the electrode assembly was sintered in air at 340° C.

The preparation of electrodes by means of printing techniques, as part of the production of a bi-polar capacitor, is described in WO 03/71563 and WO 07/13077.

The present invention is concerned with a process for the manufacture of a cathode assembly which exhibits improved current collection. It should be noted, however, that the cathode assembly of the invention, as set out below, is not limited to any specific cell configuration and can be used as the cathode in both primary and secondary metal/air cells and in other electrochemical devices.

The process of the invention involves the production of discrete electrode assemblies which are directly obtained in the desired shape and size. The central region of each individual, essentially planar, current collector (provided, e.g., in the form of a rectangular or square metal mesh) is loaded with active electrode particles, while a substantial portion of the peripheral region of the current collector, or preferably the entire peripheral region, is left free of active material. Electronically conductive metallic bars can therefore be applied onto the peripheral region, thus allowing the reduction of the overall resistance and the extraction of higher currents from the electrode, with less voltage drop. The process of the invention also allows an effective application of the hydrophobic porous film or layer (e.g., the PTFE film) onto the electrode surface. It should be noted that the phrase "application of a hydrophobic porous film or layer onto the electrode surface" is meant to include all ways of coupling an aqueous electrolyte-impermeable film or layer with the electrode, e.g., by means of an attachment of a commercially available hydrophobic film onto the electrode surface or through an in-situ formation of a thin hydrophobic layer on the surface of the electrode.

Accordingly, the invention relates to a process for preparing an electrode assembly, comprising providing a current collector having a planar perforated member and a conductive metal frame surrounding said member, introducing a catalyst composition into the pores of said perforated member, applying an aqueous electrolyte-impermeable film or layer onto one face of said current collector either before, after or concurrently with the introduction of said catalyst, and sintering the resultant electrode assembly.

The current collector used in the process comprises a perforated, essentially planar member, which is preferably rectangular or square-shaped. The perforated member is preferably provided by an electronically conductive mesh or an expanded foil made of a metal selected from the group consisting of nickel, nickel plated copper, stainless steel, tin, bismuth, silver and alloys thereof, with nickel being especially preferred. The mesh size is from 10 to 500 mesh, and its thickness is from 20 µm to 500 µm. Suitable perforated members are available in the market, e.g., from Gerard Daniel Worldwide, such as nickel grids with 70-75 µm wire diameter and 200 µm mesh opening, or expanded foil from Dexmet Corporation (5Ni5-050P). When the electrode assembly is intended for use as air cathode in metal-air electrochemical cells operating with an alkaline electrolyte, then the area of the porous central region of the current collector (which, following catalyst loading, turns into an electrochemically-active region, as set forth below) is in the range of 10-2500 cm$^2$.

It should be noted that the perforated member, which serves as a current collector, may be in the form of a mesh, an expanded foil, a foam or a perforated foil. Expanded foil results from a process in which perforations are formed in a metallic foil, following which said perforations are mechanically expanded. Foam is a three dimensional, porous structure of a certain type of metal. Regardless of its specific shape, the perforated member is referred to herein, for the purpose of simplicity, as a "mesh" or "grid".

The periphery of the current collector is provided by a highly conductive metal frame, whose open area essentially corresponds in shape and size to the mesh described above. The outer dimensions of the frame are approximately (3 to 40 cm)×(3 to 40 cm) and the inner dimensions of the frame are slightly smaller, e.g. the inner dimension is about 0.5-2 cm shorter than the outer dimension. The frame is preferably made of copper, nickel, or nickel plated copper, and its thickness is between 25 μm and 3 mm.

The mesh, e.g., the nickel mesh, is placed in the open area of the frame and the two members are attached to one another by means of suitable techniques, such as a conductive adhesive material (e.g., a conductive epoxy) or welding (e.g., point welding, laser welding, ultrasonic welding or solder welding), to form the current collector. Suitable techniques are applied to ensure low electrical resistance and multiple flow paths for the electrical current; for example when point welding is applied, the welding must be made at a sufficient number of points (e.g., between 2-50 points on each side of the square structure having the exemplary dimensions set out above).

Figure 2:
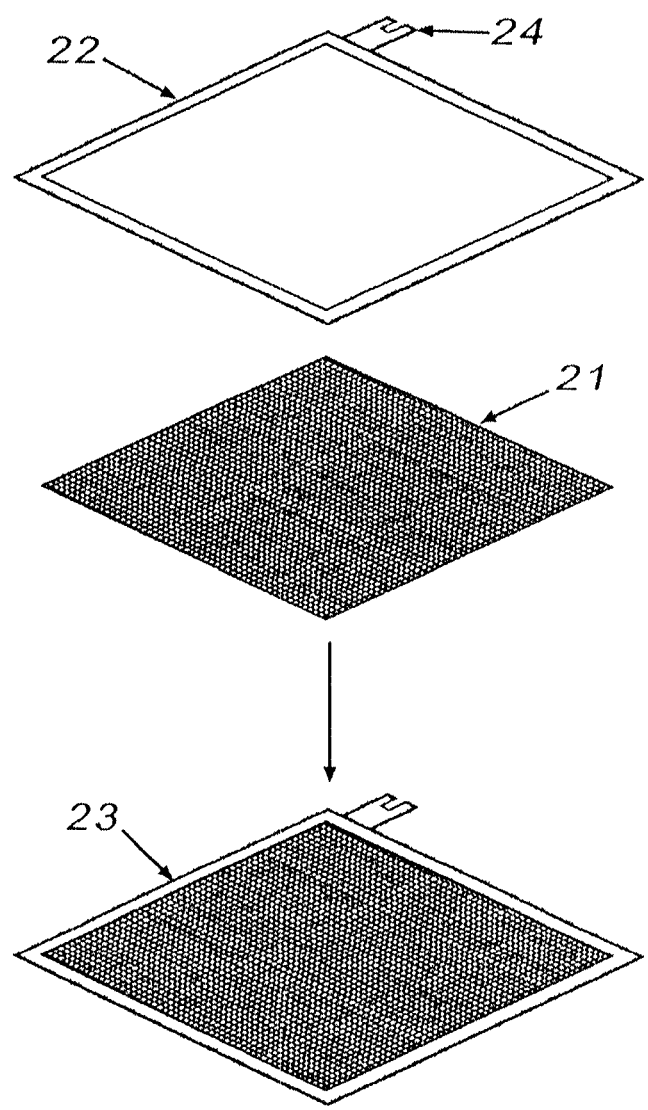

FIG. 2 illustrates the preparation method set forth above and the current collector formed by this method. Numerals 21 and 22 indicate the mesh and the metal frame, respectively. The area of the porous, central region of the current collector (namely, mesh 21) is about 75-97% of the total area of the current collector 23. Electrical conducting tab 24 is provided in one side of the current collector. Tab 24 is either an integral part of the current collector, bonded or welded to the current collector or mechanically attached to the current collector. Preferably, mesh 21 is made of nickel and the conductive metal frame 22 is nickel plated copper, with the thickness of the nickel plating provided on the copper frame being from 1 to 50 μm.

Figure 3:
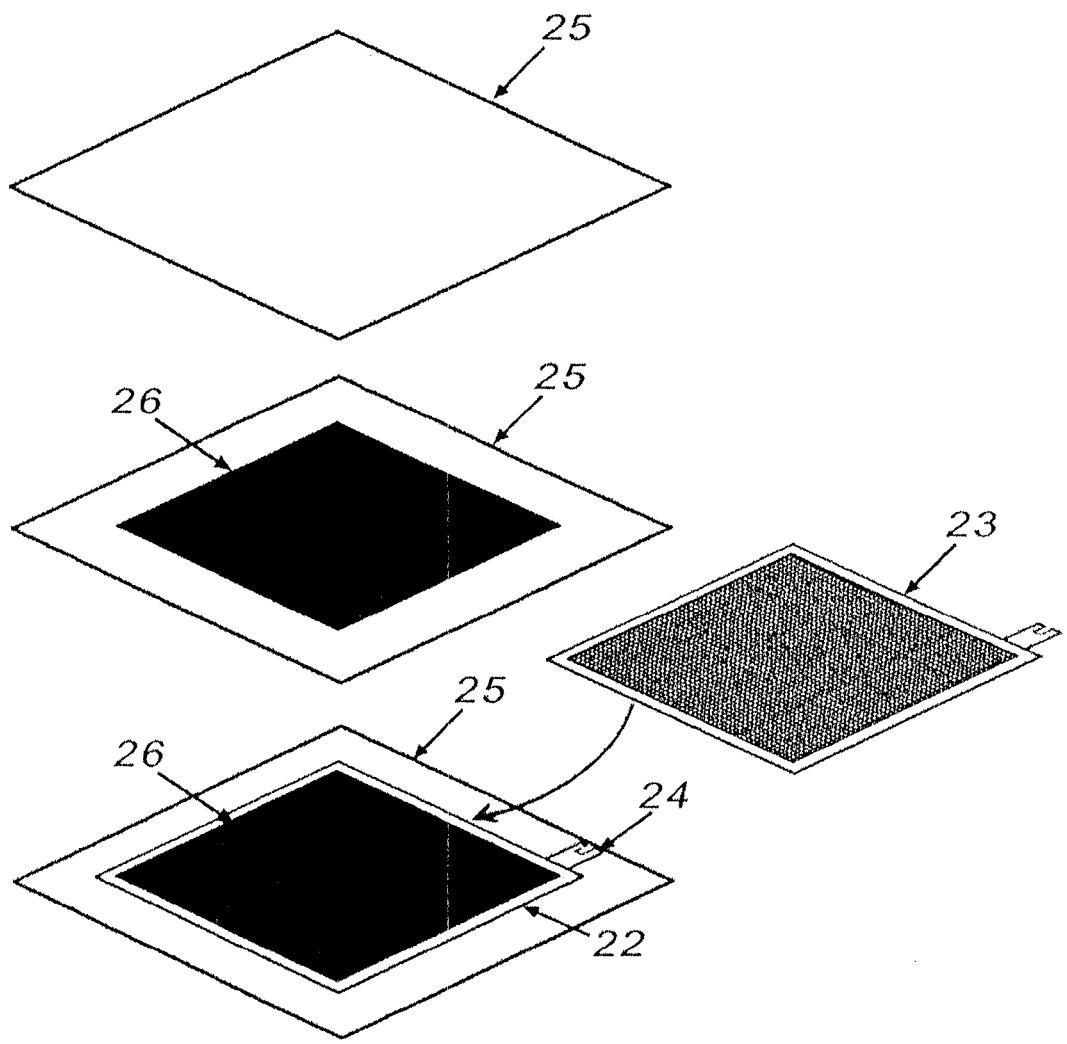

In the next stage, which is illustrated in FIG. 3, the porous central region 21 of the current collector is converted into an electrochemically-reactive region through the introduction of active particles thereinto. When the electrode is intended to be used as air cathode, then the active particles comprise a catalyst capable of promoting oxygen reduction. To this end, the catalyst is provided in the form of a printable composition which is applied onto the current collector through a printing technique.

A printable composition suitable for use according to the invention is prepared by thoroughly mixing the catalyst particles together with one or more binders, in an aqueous or in an organic carrier (e.g., in a water-miscible alcohol), or in a mixture thereof. As used herein, the term "printable composition" refers to a mixture exhibiting the necessary physical properties, e.g., flowability and thixotropicity for application in printing techniques, such as screen-printing, stencil-printing, inkjet printing and roller-coating.

The concentration of the catalyst in the printable composition of the invention is preferably not less than 1%, e.g., from 5% to 80% (w/w). Catalysts operable in the process of the invention include (but not limited to) silver particles, such as the silver powder associated with zirconium oxide disclosed in U.S. Pat. No. 8,142,938. The properties of this particular type of silver particles are follows: the average primary particle size is from 40 to 60 nm; the average agglomerate size is from 1 to 25 μm; the average agglomerate porosity is about 38 to 45%, the zirconium oxide content is from 0.2 to 4% (w/w) and the specific surface area is from 4 to 10 m$^2$/g. The particles are highly pure, namely, the silver and $ZrO_2$ content is not less than 99.9%.

Other suitable catalysts for promoting oxygen reduction include platinum, tungsten carbide, cobalt, manganese dioxide, spinel type compounds, perovskite type compounds (i.e. mixed metal oxides having of the formula $ABO_3$ in which A and B are cations of two different metals and in which the A cation is coordinated to twelve oxygen atoms while the B cation occupies octahedral sites and is coordinated to six oxygen atoms), carbon based particles such as carbon black combined with platinum, palladium and silver. Mixtures of the various catalysts set out above can also be used.

The concentration of the binder in the printable composition of the invention is preferably not less than 1%, e.g., from 1% to 30% (w/w). The binder which is combined with the catalyst particles to form the printable composition may be hydrophobic, and may serve several useful purposes. The binder allows the formation of a uniform composition having paste-like consistency. The binder may be hydrophobic, such that it contributes to the attachment of the hydrophobic sheet which forms part of the electrode assembly of the invention. The binder may also contribute to the hydrophobic characteristic of the electrochemically reactive zone, which consists of the solid catalyst (e.g. silver particles), the alkaline electrolyte and air. Suitable binders include fluorinated polymers and copolymers, e.g., fluorinated ethylene propylene copolymer (abbreviated herein "FEP"), which is a copolymer of hexafluoropropylene and tetrafluoroethylene and is hence compatible with the PTFE separator applied. Other suitable binders include PVDF (polyvinyl difluoride), PFA (perfluoroalkoxy), THV (a copolymer of tetrafluoroethylene, hexafluoropropylene and vinylidene fluoride), polyethylene such as Coathylene or chlorotrifluoroethylene.

The printable composition also comprises a liquid carrier which preferably consists of an aqueous alcohol, e.g., a mixture of water and ethanol, or water and isopropanol. Preferably, the water and alcohol are used in approximately equal volumes.

The printable composition is prepared by combining together the catalyst, the binder and the liquid carrier. To this end, the binder is conveniently applied in the form of an aqueous dispersion which is first mixed with the catalyst, followed by the addition of water and alcohol and the vigorous stirring of the resultant composition until a paste is formed. The mixing may be intermittently interrupted, allowing the composition to stand for not more than 60 minutes following each interruption.

It should be noted that one or more additional ingredients may be present in the printable composition, such as an electronically conductive powder, e.g., carbon, graphite, nickel, nickel coated carbon, tungsten carbide, or oxide or nitride of titanium. In general, the weight concentration of said additive(s) in the printable composition is from 0% to 80%.

The introduction of the printable composition into the porous, central region of the current collector and the attachment of the thin hydrophobic film (e.g., the PTFE film) thereto can be accomplished either successively or concurrently. The introduction of the printable composition into the pores of the current collector involves the application of a printing technique. The amount of the printable composition per unit area of the current collector is preferably from 10 mg/cm² to 150 mg/cm².

According to one variant of the invention, the operations set forth above, namely, catalyst introduction and compaction and hydrophobic film coupling, are carried out through a plurality of successive stages. To this end, a temporary, removable "tray" is used in the fabrication of the electrode employing a stencil or screen printing technique.

In the first stage, the tray, in the form of a relatively thick hydrophobic support sheet (e.g., polypropylene, polyethylene, silicon or a thick PTFE sheet), the current collector and a stainless steel stencil whose thickness is from about 50 microns to 1 mm are placed one on top of the other on the working surface of a printing machine. The printable composition is then applied onto the surface of the stainless steel stencil, following which the stencil is removed and a suitable cover (e.g., a plurality of papers) is placed above the current collector. Catalyst compaction is then accomplished in a press. For this purpose, the structure, consisting of the mechanical tray, the current collector loaded with the electrode particles and the cover, is transferred to a press in which 0.5-35 ton pressure is applied, turning the electrode particles into a compressed mass embedded within the central, porous region of the current collector. The cover is then peeled off the catalyst-loaded current collector, which in turn is separated from the mechanical tray (e.g., from the polypropylene sheet). The resultant element, consisting of the current collector with catalyst particles affixed within its central region, is herein referred to as an "electrode".

It should be noted that the stage set out above consists of several steps (e.g., assembling the mechanical tray and the current collector, followed by the printing of the catalyst formulation), and the order of these steps may be reversed. For example, in the embodiment illustrated in FIG. 3, the catalyst composition (26) is printed directly onto the surface of the mechanical tray (e.g., onto a polypropylene sheet (25)). The current collector (23) is then placed on the printed region, which has the shape of a square or rectangular, such that the sides of the conductive metal frame 22 are aligned with the sides of said printed region. The current collector is then pressed against the catalyst printed region whereby the catalyst penetrates into the pores of the current collector. The temporary polyethylene sheet tray is then detached from the electrode and excess electrolyte is removed.

Figure 4:
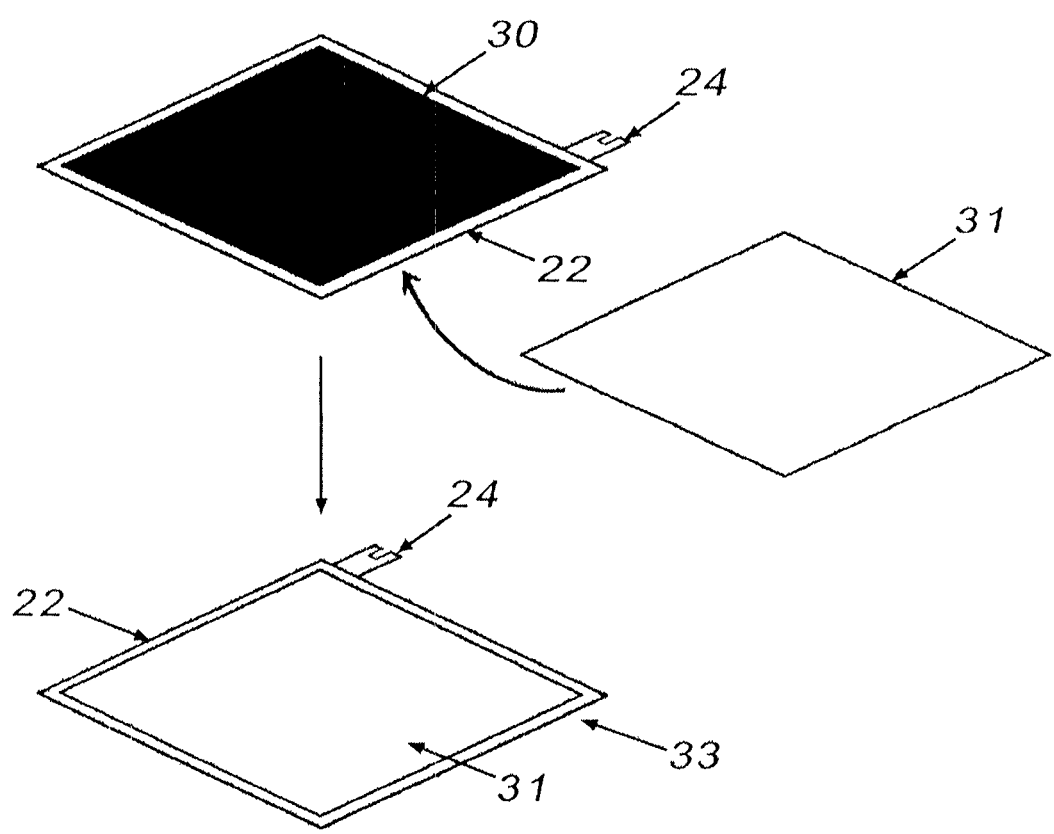

In the next stage, which is illustrated in FIG. 4, the electrode (30) and the porous hydrophobic film (31) are attached to one another through the application of pressure in a press. To this end, a porous hydrophobic film (31) on a liner (e.g., PTFE film with thickness ranging from 10 to 400 microns, commercially available from Saint Gobain or Gore), which corresponds in shape to the electrode (30), optionally with slightly larger dimensions, is placed above the electrode and a force pressure of not less than 1-2 tons is applied to form good contact between the PTFE film and the electrode. The resultant electrode assembly is indicated by numeral 33, where the top face shown is the face consisting of the hydrophobic film (31); the bottom face of electrode assembly 33 (not shown) consists of the catalytically active face.

According to another variant of the invention, the operations set forth above, namely, catalyst introduction and compaction and hydrophobic film coupling are carried out essentially simultaneously, such that there is no need to use a temporary removable tray. In this variant of the invention, the hydrophobic PTFE film is supported on a suitable substrate, e.g., silicon-coated substrate to which the PTFE film is weakly attached. The printable composition is applied onto the upper face of the PTFE film. The current collector is then placed on the PTFE film (it should be noted that application of the printable composition and the placement of the current collector may be carried out in a reverse order) and the resultant single-gridded cathode is pressed under the conditions set forth above.

Following compaction in the press, the electrode assembly is oven-sintered at the maximum tolerable temperature, which is about 230-360° C., preferably 230-300° C., more preferably about 250-280° C., for a period of about 5 to 30 minutes. It should be noted that the hydrophobic PTFE film does not easily withstand the conditions encountered at the sintering stage, and it tends to detach from the current collector. The attachment of the PTFE film onto the face of the current collector may be facilitated mechanically, e.g., using releasable fastening means, e.g., simple clips which hold the PTFE film to the perimeter of the electrode assembly or chemically, by increasing the amount of the binder present in the printable composition used in forming the electrode. In particular, the use of FEP as a binder in the printable composition allows a relatively low workable sintering temperature.

In a preferred embodiment of the invention, at the printing stage, the printable composition is not applied over the entire central region of the current collector. Stated otherwise, the active central region of the electrode assembly, which is loaded with the catalyst particles, is not contiguous with the frame which serves for the enhanced current collection. At the printing stage, a narrow gap of about 1-7 mm is left between the inner boundary of the frame and the boundary of the region filled with the active material. Either before or after the sintering stage, the gap provided around the perimeter of the active region, separating same from the frame, is filled, at least partially, with a sealant which is preferably selected from the group consisting of epoxy, silicone, polyurethane, acrylates, rubber or rubber like compounds such as butadiene. However, in another variant of the invention, a sealant-receiving gap is not provided at the printing stage, as set forth above, such that the active central region of the electrode assembly is contiguous with the frame, as shown in the specific embodiments of the invention illustrated in the Figures. In such cases, the sealant can be applied onto the electrode surface, and also onto the opposing face having the hydrophobic porous film provided thereon. The sealant is finally cured, e.g., by means of placing the electrode assembly in an oven.

According to the variants of the inventions set forth above, a commercially available hydrophobic film was attached to the electrode to form the electrode assembly. However, in some cases it may be advantageous to form in-situ a hydrophobic coating onto the electrode, in lieu of using a film, for example, when the commercially available film is found to exhibit a high shrinkage rate or when improved contact between the catalyst layer and the hydrophobic layer is desired.

The in-situ formation of a hydrophobic coating may be accomplished by means of applying a curable coating composition in the form of a liquid carrier comprising hydrophobic particles onto the catalytic region of the electrode, removing the liquid carrier and curing the coating.

A suitable coating composition can be prepared by mixing hydrophobic particles, such as FEP (e.g., Ultraflon FP-15 produced by Laurel) or PTFE (e.g., Zonyl 1100 produced by Dupont) with ethanol at a weight ratio from 1:3 to 1:20 until a homogeneous mixture is formed. The mixture is then conveniently applied onto the electrode surface, e.g., by means of spraying.

Following drying at room temperature whereby the liquid carrier is removed, the electrode is sintered whereby the coating is cured at an elevated temperature which is preferably about 5-10 degrees above the melting point of the polymer of which the hydrophobic particles are composed. For example, FEP melts at a temperature of 265° C. and PTFE melts at temperature of 325° C. The curing of the coating usually lasts about 2-25 minutes. The thickness of the coating is typically between 100 and 500 microns. The amount of the coating is usually from 10-50 mg per square centimeter It is often advantageous to repeat the coating procedure set out above, in order to overcoat defects that might have occurred during the first coating operation, thus ensuring the uniformity of hydrophobic coating applied onto the catalytic region. The thickness of the second coating is roughly from 5 to 500 microns. The weight of the second coating is usually from 2-50 mg per square centimeter. The curing/sintering step is then repeated under the conditions set forth above. Of course, the coating/sintering cycles may be repeated for several times.

In another aspect, the invention provides an electrode assembly comprising an electronically conductive metal frame surrounding the entire perimeter of a perforated, essentially planar member having an electrode material applied within the pores thereof, thereby providing a central electrochemically active region, said assembly further comprising a hydrophobic film attached to one face thereof.

The frame preferably consists of a flat, non-folded border that is co-planar with the perforated member and is welded or soldered to said perforated member. According to one embodiment of the invention, the central electrochemically active region is contiguous with the electronically conductive metal frame. According to another embodiment of the invention, a gap, optionally containing a sealant, is separating between the metal frame and said central electrochemically active region, such that said electrochemically active region is not in contact with said frame. The sealant may extend onto the surface of electrochemically active region and/or onto the surface of the frame. According to yet another embodiment of the invention, the electrode region extends onto the surface of the metal frame.

The electrode comprises a catalyst for promoting oxygen reduction, which catalyst preferably consists of silver associated with zirconium oxide, as set out above, and a binder, which is preferably FEP, wherein the weight ratio between the catalyst and the binder is preferably not less than 6:1. For example, the catalytically active composition contains a binder in an amount between 4 and 15%, more preferably 5 and 14% and even more preferably 5 and 13% (w/w).

As noted above, the electrode assembly of the invention is suitable for use as air cathode in, inter alia, aluminum/air batteries having configurations well known in the art. The battery typically comprises a plurality of cells in a stack arrangement. The electrodes are immersed in an electrolyte contained within a suitable tank provided with circulation and venting means for exposing the cathode to oxygen atmosphere. Such batteries can serve as power source for electric vehicles.

Another aspect of the invention relates to a process for preparing a curved electrode assembly, comprising providing an essentially planar current collector consisting of a perforated member having the shape of a parallelogram, e.g., a rectangle or a square, and a conductive metal frame surrounding three sides of said member, introducing a catalyst composition into the pores of said perforated member, applying an aqueous electrolyte-impermeable film or layer onto one face of said current collector either before, after or concurrently with the introduction of said catalyst, sintering the resultant electrode assembly, and turning the essentially planar electrode assembly into a curved spatial body, e.g., a cylinder, with the outer lateral curved surface of said body being said aqueous electrolyte-impermeable film or layer.

The fabrication of the planar electrode assembly is carried out according to the description set forth above. The final step of turning the planar electrode assembly into a spatial, e.g., tubular body is accomplished by rolling the planar electrode assembly along its open side (the side which is devoid of the frame). The open side is preferably the shorter side of the rectangle.

The invention also provides a cylindrical electrode assembly defined by a lateral surface and two open bases, wherein the outer face of said lateral surface is provided by an aqueous electrolyte-impermeable film or layer, and the inner face of said lateral surface is provided by a perforated metallic member having an electrode material applied within the pores thereof, said electrode assembly further comprising electronically conductive metal frames encircling the two open bases of said cylinder and an electronically conductive metal segment extending along said lateral surface in parallel to the axis of said cylinder.

The compositions of the electrode material and the aqueous electrolyte-impermeable film or layer for the tubular structure are as set forth above with respect to the planar configuration of the electrode assembly.

Another aspect of the invention relates to the prevention, or at least minimization, of electrolyte leakage which occurs in metal/air cells. As mentioned above, in its most usual configuration, an air cathode comprises of a hydrophobic film which is permeable to air but not water and a catalytically active layer; the structure is supported by an essentially planar perforated metallic member, e.g., a metal grid current collector. The hydrophobic film (PTFE) faces the exterior of the electrochemical cell whereas the catalytically active layer faces the aqueous electrolyte.

Typically, the hydrophobic film, the catalytically active layer and the metal grid correspond in geometric form and size. For example, U.S. Pat. No. 3,553,024 describes the preparation of a catalytically active material in the form of a paste consisting of platinum black and a binder (colloidal PTFE) which is spread over one face of a PTFE film. A piece of platinum gauze of the same size as the PTFE film is then laid over the coated surface of the PTFE film and pressed into the film. The resultant structure is dried and sintered.

The aqueous electrolyte cannot flow across, and seep through, the PTFE film due to the highly hydrophobic nature of the film. However, electrolyte seepage still occurs because the electrolyte flows downwardly over the internal surface of the PTFE film and leaks through the interface between the film and a mechanical gasket applied on or near its edges.

Electrolyte leakage and electrolyte loss negatively affect the performance of the air cathode and a metal/air cell where the cathode is utilized. Electrolyte leakage can be minimized if the catalytically active layer provided on one face of the film is at least partially surrounded with a narrow layer of a sealant, especially a sealant capable of penetrating into the porous hydrophobic PTFE film. The sealant forms a continuous boundary layer applied on the marginal area of the film (i.e., in a narrow gap between the edges of the film and the boundary of the catalytically active layer). As shown below, the presence of a sealant boundary layer in direct contact with the marginal area of the hydrophobic film improves the performance of the electrode. The electrode demonstrates stable performance over long test periods. It appears that the penetration of the sealant into the PTFE film, such that the porosity of the film is partially filled, e.g., to a slight depth, allows the formation of a good mechanical barrier for electrolyte seepage.

Accordingly, one aspect of the invention is an electrode assembly suitable for use as an air electrode, comprising a catalytically active layer applied on one face of a hydrophobic porous film and a conductive current collector pressed onto said catalytically active face, wherein at least a portion of the marginal area of said face is free from catalyst, and wherein a sealant is provided around at least part of the perimeter of said catalytically active layer, said sealant forming a coating onto the catalyst-free marginal area of said face of said hydrophobic film. The sealant coating is preferably cohesive; i.e., it is a continuous coating which adheres to the film. For example, the sealant is an epoxy sealant which is preferably present in at least some of the pores of the marginal area of the hydrophobic porous film.

Figure 5:
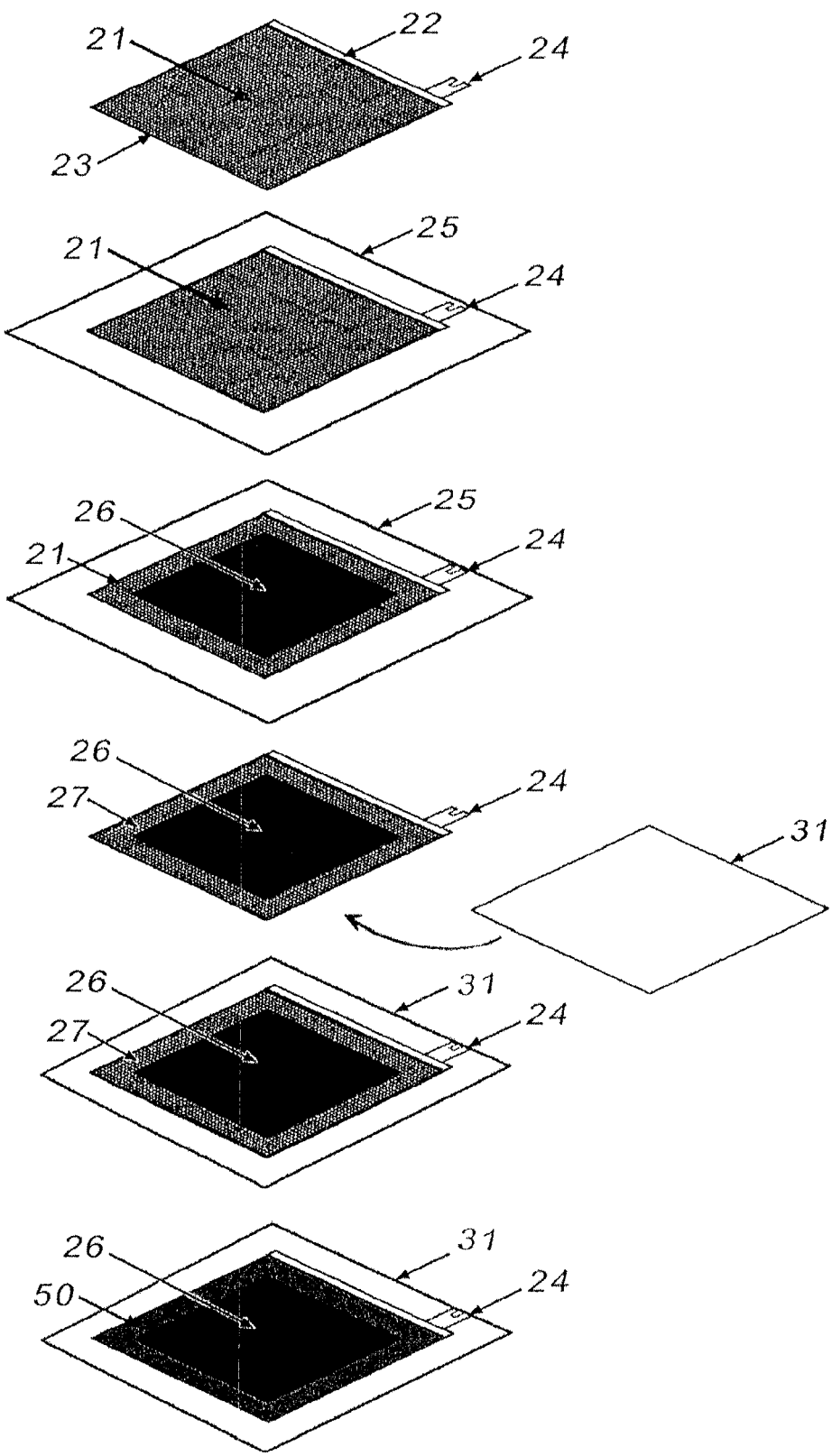

The electrode assembly can be fabricated in different ways, most conveniently employing the printing techniques set forth above for laminating the hydrophobic film and the catalytically active layer together with the current collector. For example, as shown in FIG. 5, a rectangular or square metal grid (21) with one solid metal piece (22) attached to one side of the grid is used as a current collector (23). The solid metal piece (22) corresponds in length to the grid dimension and is also provided with a tab (24). In the specific embodiment shown in FIG. 5, only one side of the grid is modified with piece (22) for improving current collection but is should be understood that additional sides may be similarly modified. Numeral (25) indicates a "tray" used in the printing step, as described above. The current collector (23) is laid over the "tray" and a printable composition comprising a catalyst utilizable in oxygen reduction reaction and a binder, as set out in detail above, is applied over the central region of the metal grid current collector to form the catalytically active layer (26). The marginal area (27) of the metal grid current collector is free of the catalytically active material. The catalyst-free marginal area (27) which surrounds the electrochemically active central area (26), i.e., the gap between the edges of the current collector and the central area filled with the active material, is between 1 and 14 mm wide. More, preferably, the width of marginal area (27) is between 1 and 10 mm, e.g., around 3 to 8 mm.

The catalyst-free marginal area of the metal grid is coated with a binder (e.g., FEP), following which a porous hydrophobic PTFE film (31), which is preferably slightly larger than the metal grid (21), is attached to the metal grid and pressure is applied on the structure to achieve good contact between the hydrophobic film (31) and the active catalytic layer (26). It should be noted that a different order of steps may be employed (not shown), e.g., a layer of the catalyst composition (26) can first be printed on the PTFE film (31), and then the metal grid current collector (23) is pressed into the coated PTFE film. Irrespective of the order of steps, the resultant structure consisting of the PTFE film, the catalytically active layer and the current collector is then heat treated, i.e., oven-sintered at about 240 to 320° C. for about 1 to 60 minutes.

The electrode assembly is allowed to cool to room temperature, following which a sealant (50) is applied on the marginal area (27), for example, by means of the printing technique described in detail above, and the electrode is again heat treated at a temperature in the range from 50 to 100° C. whereby the sealant solidifies and cures. The sealant is applied in an amount of from about 20 to 600 mg per square centimeter, and the thickness of the sealant layer formed on the marginal area of the surface of the PTFE film is from 10 to 800 µm. The sealant is preferably selected from the group consisting of epoxy, silicone, polyurethane, acrylates, rubber or rubber like compounds such as butadiene.

Thus, another aspect of the invention is a process for preparing an electrode assembly, comprising:
assembling hydrophobic film and a catalytically active layer together with a current collector, wherein said catalytically active layer and current collector are placed on one face of said hydrophobic film and wherein at least part the marginal area of the catalytically active face of said hydrophobic film is free of catalyst;
heat treating the so formed structure; and
applying a sealant onto the catalyst-free marginal area of the catalytically active face of said structure to form a sealant coating on the marginal area of the hydrophobic film.

For example, the process may be carried out by introducing a catalyst composition into the pores of the central area of a metal grid current collector, such that at least part of the marginal area of said metal grid is free of said catalyst composition, coupling an aqueous electrolyte-impermeable hydrophobic film to one face of said current collector, heat treating the resultant structure and applying a sealant onto said marginal area. According to another variant, the process is carried out by applying a catalyst composition (e.g., by printing or rolling) onto one face of the hydrophobic film, to form a catalytically active face with marginal area which is free of said catalyst, pressing a current collector into said catalytically active face, heat treating the so formed structure and applying the sealant onto said marginal area.

The printing (e.g., stencil printing) based method described above allows an effective lamination of the hydrophobic film, the catalytically active layer and the current collector, and the formation of cohesive sealant layer which adheres over the marginal area of the hydrophobic film, surrounding the perimeter of the catalytically active layer. Alternative to the printing technique, the catalyst composition consisting of the catalytically active particles and a binder can be formulated into a paste which may be directly spread over the central area of the hydrophobic film by any convenient technique, or the catalyst and the binder may be applied in the form of a dispersion that can be sprayed onto the film, following which the metal grid current collector is pressed onto the coated film. The structure is then heat treated, followed by the application of the sealant to the catalyst-free marginal area and a subsequent curing as set out above.

A particularly suitable sealant is an epoxy sealant applied as a two-component system consisting of an epoxy base and a hardener. The epoxy base, hardener or both, preferably comprise one or more organic solvents. Suitable two-component epoxy systems are available commercially, e.g., from 3M or Coates Screen Inks GmbH. For example, the epoxy base component may contain an epoxy resin which is the reaction product of bisphenol-A with epichlorohydrin, with number average molecular weight of less than 700. The epoxy base component may further include one or more additional solvents/diluents such as esters (2-butoxyethyl acetate, 2-methoxy-1-methylethyl acetate), ketones (e.g., cyclohexanone), naphtha and aromatic hydrocarbon (xylene). The hardener component may be selected from the group consisting of amines, acids, acid anhydrides, phenols, alcohols and thiols.

It may be useful to combine an organic diluent with the two-component epoxy system. For example, the epoxy base, the hardener and an organic diluent are thoroughly mixed together prior to application. In this way, the viscosity of the sealant liquid precursor is reduced while flowability and wettability of the sealant on the surface of the hydrophobic film are enhanced. It believed that the diluted sealant is capable of penetrating into the pores of the hydrophobic film, such that following curing, an adherent, cohesive sealant layer is formed on the marginal area of the film. Suitable diluents may be selected from the group of glycol ethers, including the sub-class of ester solvents, e.g., ethylene glycol mono alkyl ether acetate, such as, for example, 2-butoxyethyl acetate. The weight ratio between the diluent added and the total quantity of epoxy base and hardener is from 4:100 to 10:100. The diluant exhibits sufficient volatility, such that it evaporates under the conditions of the final heat treatment.

In particular, bisphenol A-(epichlorohydrin) epoxy resin supplied in an organic carrier (sold by Coates Screen Inks GmbH as a screen printing ink under product name Z-65), a hardener comprising M-tolylidene diisocyanate and n-butyl acetate (sold by Coates Screen Inks GmbH under product name Z/H) and a diluent which is 2-butoxyethyl acetate (sold by Coates Screen Inks GmbH under product name VD 60) can be mixed together at weight ratio 70-80:20-30:4-10, respectively, to form low-viscosity, readily printable mixture.

Scanning electron microscopy (SEM) can be used for studying the features of the lateral side of the electrode, assessing the suitability of a particular sealant, i.e. determining whether a sealant is capable of penetrating into the porosity of the PTFE film to allow the formation of a good barrier against electrolyte leakage. Energy-dispersive X-ray analysis (EDX; EDAX) for determining elemental composition can also be used for this purpose, to reveal variation in fluorine concentration across the lateral side of the electrode (high, fluorine concentration is indicative of a "natural" PTFE film; zones with reduced fluorine concentration correspond to "mixed" sealant-containing PTFE segments).

Another aspect of the invention is a method of minimizing an electrolyte seepage in metal/air cells, comprising utilizing in said cells an air cathode which comprises a catalytically active layer applied on a central area of the internal face of air permeable hydrophobic film, such that the marginal area of said internal face is free of catalyst, with current collector (e.g., in the form of a metal grid) being pressed onto said internal catalytically active face, characterized in that a sealant coating is applied on the catalyst-free marginal area of said internal face of said film.

Figure 6:
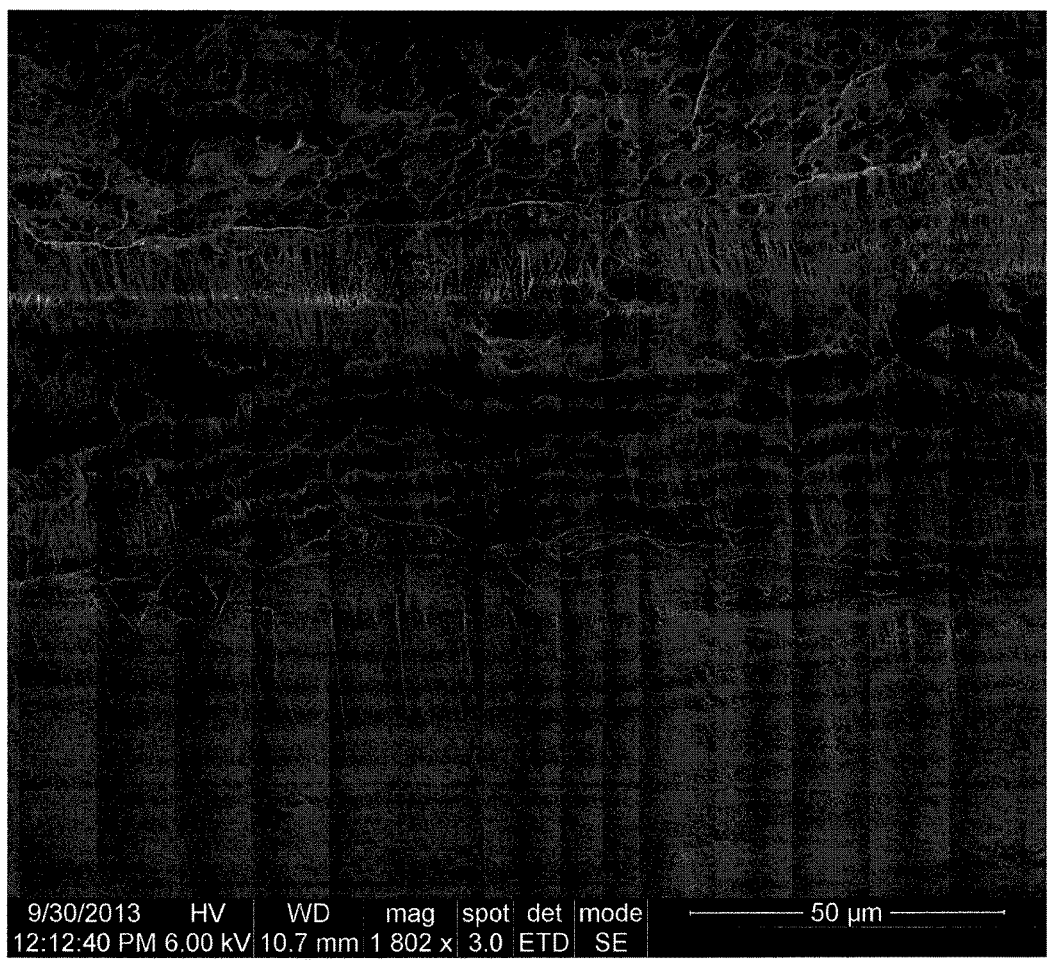
Figure 7:
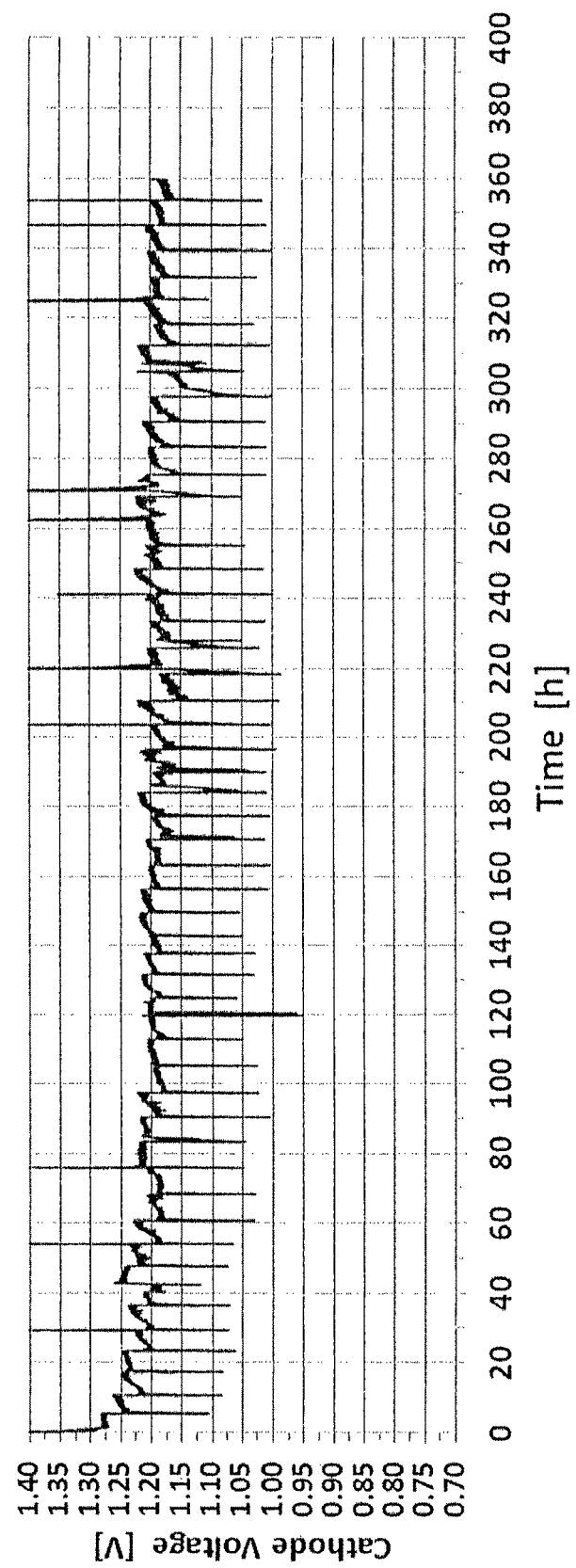

In the drawings:

FIG. 1 illustrates a metal/air cell.
FIG. 2 illustrates the preparation of a current collector.
FIG. 3 illustrates the printing of a catalyst composition.
FIG. 4 illustrates the coupling of a hydrophobic porous film.
FIG. 5 illustrates the preparation of an electrode assembly of the invention, with a sealant coating applied on the catalyst-free marginal area of the hydrophobic film.
FIG. 6 is a SEM image of the lateral side an electrode assembly produced by the process shown in FIG. 5.
FIG. 7 is voltage vs. time plot demonstrating the performance of the electrode assembly produced by the process shown in FIG. 5.

EXAMPLES

Preparation 1

Printable Catalyst Formulation

Silver catalyst (70 grams; prepared as described in U.S. Pat. No. 8,142,938) is mixed with 10 grams of FEP (available from Dupont in the form of aqueous dispersion, TE-9568). The mixture is placed in a rotating shaker for 1 hour. Water (20 grams) and isopropanol (20 grams) are then added to the mixture and the shaker is allowed to rotate for an additional period of 25 minutes. The resultant composition is allowed to stand for 1 hr and is then remixed for 25 minutes. The resultant composition exhibits good flowability and thixotropicity and is suitable for use as a printable material.

Preparation 2

Printable Catalyst Formulation

Silver catalyst (70 grams; prepared as described in U.S. Pat. No. 8,142,938) and 70 grams of nickel-coated carbon particles (60% w/w, such as E-2701 or E-2702 commercially available from Sulzer) are mixed with 14 grams of FEP (available from Dupont in the form of aqueous dispersion, TE-9568). The mixture is placed in a rotating shaker for 1 hr. Water (40 grams) and ethanol (40 grams) are then added to the mixture and the shaker is allowed to rotate for additional 25 minutes. The resultant composition is allowed to stand for 1 hour and is then remixed for 25 minutes. The composition thus formed exhibits good flowability and thixotropicity and is suitable for use as a printable material.

Example 1

Air Electrode Assembly

Preparation of the current collector: Nickel mesh (commercially available from Gerard Daniel Worldwide (0.007 thickness nickel wire, plain weave 200 mesh) is cut with a guillotine knife to form a square shape with 16.5 cm*16.5 cm dimensions. The resultant mesh is thoroughly cleaned with ethanol and metallic particles are blown off from the mesh using air pressure.

A 500 μm thick copper sheet is cut using a stamp to remove its central area, producing a square frame with an open area which is slightly smaller than the area of the nickel mesh. The outer and inner dimensions of the frame are (16.5 cm×16.5 cm) and (14.5 cm×14.5 cm), respectively. An electrical conducing tab of rectangular shape (5*3 cm$^2$) is provided on one side of the frame. The copper frame is then plated with nickel by means of electroless nickel plating, thereby forming a nickel coating which is about 20 microns thick.

The nickel mesh is then welded to the nickel-coated copper frame by means of point welding.

Preparation of the electrode: The catalyst formulation of Preparation 1 is applied on the current collector as follows. A 200-300 μm thick polypropylene sheet, the current collector and a ~500 μm stainless steel stencil are placed on a printing machine (Ami Presco model MSP-9155) one on top of the other, such that the polypropylene sheet and the stainless steel stencil constitute the lowermost and uppermost layers, respectively. The catalyst formulation of Preparation 1 is then applied using a blade or squeegee which is passed above the stencil such that the silver catalyst formulation penetrates through the stencil into the pores of current collector mesh. The stainless steel stencil is then removed, and 10 sheets of standard A4 paper are placed above the current collector and the stack is transferred to a press in which a 10 ton pressure is applied. The papers are carefully peeled off the electrode and the electrode is then detached gently from the polypropylene sheet.

Electrode assembly: the electrode and the hydrophobic film are combined as follows. A porous hydrophobic PTFE film (manufactured by Saint Gobain or Gore) which is slightly larger than the electrode is placed above the electrode and a pressure of 10 tons is applied using a press. The electrode assembly is then oven-sintered at about 280° C. for a period of about 20 minutes.

Example 2

Air Electrode Assembly with a Sealant Layer on the Marginal Area of the Hydrophobic Film The procedure of Example 1 was repeated. However, at the electrode printing stage, the catalyst-containing formulation was applied onto the current collector to form a centrally placed electrode, with a narrow gap of about 1-7 mm between the inner boundary of the frame and the perimeter of said centrally printed electrode. The following example illustrates the application of a sealant into said narrow gap.

The so formed electrode assembly is placed on a screen printing table, with the side having the PTFE film provided thereon facing the printing table and the opposite side, namely, the electrode side, facing upwardly. A polyester screen of 10-30 mesh, having a suitable open area which essentially coincides in shape and size with the gap located between the catalytic region and the conductive metal frame (the open area of the screen may overlap with the catalytic region by 1-3 mm and may also overlap with the conductive metal frame) is used in order to transfer the sealant into the gap.

A suitable quantity of an epoxy such as DP270 produced by 3M is applied onto the polyester screen. The screen is lowered such that it is situated above the electrode by a distance of 200-400 microns. A 50 durometer squeegee is passed over the screen at a rate of 3-5 cm/sec. The screen is raised and the epoxy-containing electrode assembly is removed from underneath the screen. The epoxy is allowed to gel at room temperature for half an hour to one hour, and then the electrode assembly is placed gently in oven at a temperature of 60° C. for a period of 1 hour, thereby curing the epoxy.

Example 3

Air Electrode Assembly

The procedure of Example 1 was repeated. However, the final stage of assembling the electrode was accomplished through the in-situ formation of a hydrophobic coating onto the catalyst layer (instead of attaching a commercially available hydrophobic film onto the catalyst).

FEP particles (Ultraflon FP-15 produced by Laurel) are added to ethanol at a weight ratio of 1:10. The mixture is vigorously stirred until a homogenous blend is formed. The mixture is then loaded into a spray gun. The opening of the gun is held about 20 centimeters above the surface of the catalyst layer of the electrode, and the coating composition is uniformly sprayed onto the catalytic region.

The electrode assembly is then allowed to dry at room temperature for 30 minutes for solvent removal, followed by oven-sintering for curing the coating at 275° C. for 20 minutes.

Example 4

A Tubular Air Electrode Assembly

A flat rectangular electrode is produced according to the procedures set forth in previous examples, with dimensions of 7 centimeters by 12 centimeters. A frame is attached to three sides of the mesh via point welding, but one of the short sides of the rectangular mesh is without a side frame. The thickness of the nickel coated copper frame is 0.35 mm and its width is frame is 4 mm.

The electrode obtained after the sintering step is rolled to form a cylinder, such that the outer lateral surface of the cylinder is the hydrophobic film. The height and diameter of the tubular structure thus formed are 7 centimeters and roughly 4 centimeters, respectively. The two short sides of the original rectangular electrode, which following the rolling extend in parallel to the cylinder axis, are connected to one another (one side is provided with a nickel coated copper frame while the other side is not). The two sides are welded, e.g., by means of point welding, such that a minimum of four points are welded between the mesh metal and the nickel coated copper frame.

Example 5

Aluminum-Air Battery

An exemplary aluminum-air cell utilizing the air electrode assembly of the invention as a cathode, which cell is suitable for use in electric vehicle, is fabricated as follows:

A flat square block of aluminum anode having area of about 160×160 mm and thickness of 10-15 mm, is symmetrically positioned in the space between a pair of air cathodes of the invention that are placed parallel to each other at a distance of about 20 mm from one another, such that the catalyst side of each air cathode is facing the aluminum anode. The electrodes arrangement is mounted within a plastic housing, such that the sides of the air cathodes having the PTFE porous film provided thereon face the air.

The electrolyte used is an aqueous solution of potassium hydroxide (350-500 g/L), which may further comprise efficiency-improving additives, such as stannate salts, glucose, poly-acrylic acid or polyacrylates, etc. The electrolyte is stored in a suitable tank. Typical electrolyte volume is determined by the desired working resource of the system, e.g., approximately 1 L for 500-600 Ah. The Electrolyte is forced to flow in the space between the air cathodes and the aluminum anode at a flow rate 0.05-0.1 L/min under pressure generated by a diaphragm pump.

Typical working temperature lies in the range from 40 to 80° C. The current drawn from the cell is in the range of 100-200 mA/cm2, at voltage 1.0-1.2V.

Example 6

Air Electrode Assembly with a Sealant Layer on the Marginal Area of the Hydrophobic Film Preparation of the current collector: Nickel mesh (commercially available from Haver & Bocker (nickel 99.2 Nickel wire, 34 mesh, wire thickness 250 µM, calendered to 0.23 mm thickness) is cut with a guillotine knife to form a square shape with 16.5 cm×16.5 cm dimensions. The resultant mesh is thoroughly cleaned with ethanol and metallic particles are blown off from the mesh using air pressure.

A 500 µm thick copper sheet is cut to form a rectangular piece (16.5 cm×0.5 cm). An electrical conducing tab (2.5 cm×3 cm) is attached to one side of the copper piece. The copper piece is then plated with nickel by means of electroless nickel plating, thereby forming a nickel coating which is about 20 microns thick.

The rectangular nickel-coated copper piece is then welded to the edge of the nickel mesh by means of point welding.

Preparation of the electrode: The catalyst formulation of Preparation 1 is applied on the current collector as follows. A 200-300 µm thick polypropylene sheet, the current collector and a ~500 µm stainless steel stencil with a cavity of 15 cm×15 cm are placed on a printing machine (Ami Presco model MSP-9155) one on top of the other, such that the polypropylene sheet and the stainless steel stencil constitute the lowermost and uppermost layers, respectively. The catalyst formulation of Preparation 1 is then applied using a blade or squeegee which is passed above the stencil such that the silver catalyst formulation penetrates through the stencil into the pores of the current collector mesh. The stainless steel stencil is then removed, and 10 sheets of standard A4 paper are placed above the current collector and the stack is transferred to a press in which a 10 ton pressure is applied. The papers are carefully peeled off the electrode and the electrode is then detached from the polypropylene sheet.

Electrode assembly: the electrode and the hydrophobic film are combined as follows. The outer perimeter of the Haber & Bocker mesh are coated with an aqueous form of FEP such as TE9568 or FEPD121 produced by DuPont via a thin paint brush and the emulsion is allowed to dry for 10 minutes. A porous hydrophobic PTFE film (manufactured by Saint Gobain or Gore) which is slightly larger than the electrode is placed above the electrode and a pressure of 10 tons is applied using a press. The electrode assembly is then oven-sintered at about 280° C. for a period of about 20 minutes. In order to prevent the membrane from shrinking or detaching from the mesh a heavy external metallic frame that coincides with the external area of the current collector is placed on the mesh and membrane thus reducing membrane detachment during the 280° C. sintering process.

The electrode is allowed to cool to room temperature prior to the printing of an epoxy sealant. An epoxy mixture prepared from 100 grams of Z-65 base epoxy and 25 grams of HM-Z/H hardener, which is further diluted with 6 g of VD 60 diluent, (the products are available from Coates Screen Ink GmbH) is screen printed through a 10 mesh polyester with a square shape rim of 14.5 cm and 0.7 cm width. The epoxy is printed with a 45 shore polyurethane squeegee onto the catalyst and the overlapping rim of the nickel mesh and the underlying hydrophobic PTFE film. The epoxy is left to gel for one hour and then sintered at 70° C. for a period of one hour.

SEM images were obtained by FEI Inspect SEM (USA) instrument equipped with an Energy-Dispersive X-ray (EDX) spectroscopy. FIG. 6 presents a SEM image of the lateral side of the electrode. As shown in the SEM image obtained, the lateral side of the marginal area of the electrode consists of three distinct layers. The lowermost, highly uniform, cohesive layer is the natural PTFE film. The uppermost cohesive layer is the sealant coating; the small cavities are presumably due to diluent evaporation. The intermediate layer interposed between the PTFE film and the epoxy coating exhibits "hybrid" character indicative of the penetration of sealant into the porous PTFE film. EDX analysis shows that the highest fluorine content (indicative of the PTFE film) is in the lowermost section of the film.

Example 7

Testing the Performance of the Electrode

The air cathode of Example 6 was utilized in a half cell 3-electrode setup described below.

The air cathode and nickel electrode are spaced 2 cm apart and connected to the positive and negative poles of a power supply with a suitable internal load. The two electrodes are of approximately the same geometrical form and size. The nickel electrode is of 99.5% purity and is 400 µm thick. The reference electrode consists of a luggin capillary with a zinc wire. An aqueous potassium hydroxide solution (30% weight concentration) is held in a storage tank at 60° C.

The experimental conditions were as follows. The current density applied was 175 mA/cm$^2$ and the electrolyte was circulated through the cell. The spent electrolyte was replaced every day with a fresh electrolyte.

A discharge curve was used to assess the performance of the electrode of the invention, as shown in FIG. 7, where the curve is plotted as voltage versus time, demonstrating a stable electrochemical performance over a long service period.

The invention claimed is:

1. An electrode assembly comprising an electronically conductive metal frame surrounding the perimeter of a perforated, essentially planar member having an electrode material applied within pores thereof, thereby providing a central electrochemically active region, said assembly further comprises a hydrophobic film attached to one face thereof, wherein said frame consists of a flat, non-folded border that is co-planar with the perforated member, and wherein a gap which contains a sealant separates the metal frame and the central electrochemically active region, such that said electrochemically active region is not in contact with said frame.

2. An electrode assembly according to claim 1, wherein the frame is welded or soldered to said perforated member.

3. An electrode assembly according to claim 1, wherein the electrode material comprises a catalyst for promoting oxygen reduction and a hydrophobic binder, wherein the weight ratio between the catalyst and the binder is not less than 6:1.

4. A process for preparing a curved electrode assembly, comprising providing an essentially planar current collector consisting of a perforated member having the shape of a either a rectangle or a square and a conductive metal frame surrounding three sides of said member, introducing a catalyst composition into pores of said perforated member, applying an aqueous electrolyte-impermeable film or layer onto one face of said current collector either before, after or concurrently with the introduction of said catalyst, sintering the resultant electrode assembly, and turning the essentially planar electrode assembly into a curved spatial body, with the outer lateral curved surface of said body being said aqueous electrolyte-impermeable film or layer.

5. A cylindrical electrode assembly defined by a lateral surface and two open bases, wherein the outer face of said lateral surface is provided by an aqueous electrolyte-impermeable film or layer, and the inner face of said lateral surface is provided by a perforated metallic member having an electrode material applied within pores thereof, said electrode assembly further comprises electronically conductive metal frames encircling the two open bases of said cylinder and an electronically conductive metal segment extending along said lateral surface in parallel to the axis of said cylinder.

6. An electrode assembly suitable for use as an air electrode, comprising a catalytically active layer and a conductive current collector pressed onto a catalytically active face of a hydrophobic porous PTFE film, wherein at least a portion of the marginal area of said face is free from catalyst, and wherein a sealant is provided around at least part of the perimeter of said catalytically active layer, said sealant forming a coating onto the catalyst-free marginal area of said hydrophobic PTFE film, said sealant penetrating into the porous hydrophobic PTFE film, such that the porosity of the film is partially filled.

7. An electrode assembly according to claim 6, wherein the sealant comprises an epoxy sealant.

8. An electrode assembly according to claim 7, wherein the sealant is present in at least some of the pores of the hydrophobic porous film, as determined by both scanning electron microscopy and energy dispersive x-ray analysis of the lateral side of electrode assembly, revealing variation in fluorine concentration across said lateral side.

9. A process for preparing an electrode assembly, comprising: assembling a hydrophobic film and a catalytically active layer together with a current collector, wherein said catalytically active layer and said current collector are placed on one face of said hydrophobic film and wherein at least part a marginal area of said face is free of catalyst;
heat treating the so formed structure; and
applying a sealant onto the catalyst-free marginal area of the catalytically active face of said structure to form a sealant coating on the marginal area of the hydrophobic film.

10. A process according to claim 9, wherein the sealant is an epoxy sealant.

11. A process according to claim 10, wherein the epoxy sealant is a two-component system comprising an epoxy base and a hardener, wherein the epoxy base, hardener or both, comprise one or more organic solvents.

12. A process according to claim 10, comprising the step of adding an organic diluant to the epoxy sealant prior to its application.

13. A method for minimizing an electrolyte seepage in metal/air cells, comprising utilizing in said cells an air cathode which comprises a catalytically active layer applied on a central area of an internal face of air permeable hydrophobic PTFE film, such that a marginal area of said internal face is free of catalyst, with current collector metal grid being pressed onto said internal face, wherein a sealant coating is applied on the catalyst-free marginal area of said internal face of said film, said sealant penetrating into the porous hydrophobic PTFE film, such that the porosity of the film is partially filled.

* * * * *